(12) United States Patent
Zhu et al.

(10) Patent No.: US 11,068,024 B2
(45) Date of Patent: Jul. 20, 2021

(54) NOTEBOOK COMPUTER

(71) Applicant: Huawei Technologies Co., Ltd., Shenzhen (CN)

(72) Inventors: Mingchao Zhu, Wuhan (CN); Heng Yang, Shenzhen (CN); Haitao Zhen, Wuhan (CN); Tao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/464,462

(22) PCT Filed: Feb. 24, 2017

(86) PCT No.: PCT/CN2017/074776
§ 371 (c)(1),
(2) Date: May 28, 2019

(87) PCT Pub. No.: WO2018/094890
PCT Pub. Date: May 31, 2018

(65) Prior Publication Data
US 2019/0369663 A1 Dec. 5, 2019

(30) Foreign Application Priority Data
Nov. 28, 2016 (CN) .......................... 201611065537.1

(51) Int. Cl.
*G06F 1/16* (2006.01)
*G06F 15/02* (2006.01)

(52) U.S. Cl.
CPC .......... *G06F 1/1616* (2013.01); *G06F 1/1622* (2013.01); *G06F 1/1681* (2013.01); *G06F 15/0216* (2013.01)

(58) Field of Classification Search
CPC .... G06F 1/1616; G06F 1/1622; G06F 1/1681; G06F 15/0216; G06F 1/1637
See application file for complete search history.

(56) References Cited

U.S. PATENT DOCUMENTS 5,195,213 A * 3/1993 Ohgami ................ G06F 1/1616
16/342
5,239,731 A * 8/1993 Lu .......................... E05D 11/081
16/340
(Continued)

FOREIGN PATENT DOCUMENTS

CN 100481841 C 4/2009
CN 201327601 Y 10/2009
(Continued)

OTHER PUBLICATIONS

Machine Translation and Abstract of Chinese Publication No. CN103573797, Feb. 12, 2014, 14 pages.
(Continued)

*Primary Examiner* — Adrian S Wilson
*Assistant Examiner* — Theron S Milliser
(74) *Attorney, Agent, or Firm* — Conley Rose, P.C.

(57) ABSTRACT

A notebook computer includes a display screen, a base, a rotating shaft coupling the display screen and the base, and a rotating shaft support disposed at an inside of a housing of the display screen and coupled to the rotating shaft in an assembly manner. The notebook computer further includes a drive circuit board disposed inside the housing of the display screen. The rotating shaft support includes a first rotating shaft support and a second rotating shaft support. A projection of the drive circuit board and a projection of the first rotating shaft support do not overlap on a place on which the display screen is located, and the projection of the drive circuit board and a projection of the second rotating shaft (Continued)

support at least partially overlap on the plane on which the display screen is located.

20 Claims, 5 Drawing Sheets

(56) References Cited

U.S. PATENT DOCUMENTS

| | | | | |
|---|---|---|---|---|
| 5,325,984 | A * | 7/1994 | Ady | B65D 43/165 |
| | | | | 220/817 |
| 5,498,165 | A * | 3/1996 | Tseng | G06F 1/1616 |
| | | | | 16/223 |
| 5,815,224 | A * | 9/1998 | Hasegawa | G02F 1/1345 |
| | | | | 349/58 |
| 6,085,388 | A * | 7/2000 | Kaneko | G06F 1/1681 |
| | | | | 16/338 |
| 6,091,601 | A * | 7/2000 | Schlesener | G06F 1/1616 |
| | | | | 361/679.28 |
| 6,212,067 | B1 * | 4/2001 | Nakajima | G06F 1/1616 |
| | | | | 248/917 |
| 6,321,416 | B1 | 11/2001 | Lu | |
| 6,389,643 | B1 * | 5/2002 | Lim | G06F 1/1616 |
| | | | | 16/260 |
| 6,421,231 | B1 * | 7/2002 | Jung | G06F 1/1616 |
| | | | | 248/918 |
| 6,657,856 | B1 * | 12/2003 | Lu | G06F 1/1616 |
| | | | | 361/679.58 |
| 6,804,859 | B2 * | 10/2004 | Lu | G06F 1/1616 |
| | | | | 16/337 |
| 6,844,902 | B2 * | 1/2005 | Inoue | G02F 1/133308 |
| | | | | 349/58 |
| 6,859,357 | B2 * | 2/2005 | Morimoto | G06F 1/1616 |
| | | | | 248/917 |
| 7,513,014 | B2 * | 4/2009 | Lin | E05D 11/06 |
| | | | | 16/342 |
| 7,578,032 | B2 * | 8/2009 | Chen | E05D 11/06 |
| | | | | 16/342 |
| 7,599,188 | B2 * | 10/2009 | Chen | G06F 1/1616 |
| | | | | 361/729 |
| 7,733,638 | B2 * | 6/2010 | Tanaka | G06F 1/1616 |
| | | | | 361/679.27 |
| 7,746,628 | B2 * | 6/2010 | Takayanagi | G06F 1/1616 |
| | | | | 16/221 |
| 8,074,322 | B2 * | 12/2011 | Wang | G06F 1/1616 |
| | | | | 16/342 |
| 8,102,650 | B2 * | 1/2012 | Tsai | G06F 1/1616 |
| | | | | 361/679.55 |
| 8,266,766 | B2 * | 9/2012 | Huang | G06F 1/1681 |
| | | | | 16/303 |
| 8,291,550 | B2 * | 10/2012 | Yang | E05D 3/04 |
| | | | | 16/342 |
| 8,760,864 | B2 * | 6/2014 | Chiang | G06F 1/203 |
| | | | | 165/104.14 |
| 9,976,326 | B2 * | 5/2018 | Huang | E05D 5/06 |
| 2003/0095390 | A1 | 5/2003 | Kim | |
| 2006/0203440 | A1 * | 9/2006 | Lev | G06F 1/162 |
| | | | | 361/679.27 |
| 2006/0288535 | A1 * | 12/2006 | Lu | E05D 5/04 |
| | | | | 16/387 |
| 2007/0143962 | A1 * | 6/2007 | Lu | G06F 1/1616 |
| | | | | 16/340 |
| 2007/0199179 | A1 * | 8/2007 | Wang | G06F 1/1616 |
| | | | | 16/340 |
| 2008/0120808 | A1 * | 5/2008 | Wang | G06F 1/1616 |
| | | | | 16/332 |
| 2009/0040702 | A1 * | 2/2009 | Tanaka | G06F 1/1658 |
| | | | | 361/679.27 |
| 2009/0059494 | A1 | 3/2009 | Takayanagi et al. | |
| 2009/0089975 | A1 * | 4/2009 | Chern | G06F 1/1616 |
| | | | | 16/321 |
| 2009/0103256 | A1 | 4/2009 | Takeguchi et al. | |
| 2011/0072620 | A1 * | 3/2011 | Wang | G06F 1/1681 |
| | | | | 16/342 |
| 2013/0322005 | A1 | 12/2013 | Ma et al. | |
| 2014/0049895 | A1 | 2/2014 | Lee | |
| 2014/0143983 | A1 | 5/2014 | Yu | |
| 2015/0009614 | A1 | 1/2015 | Tsai | |
| 2015/0277505 | A1 | 10/2015 | Lim et al. | |
| 2015/0345195 | A1 | 12/2015 | Park | |
| 2019/0346890 | A1 * | 11/2019 | Kim | G06F 1/1616 |

FOREIGN PATENT DOCUMENTS

| | | |
|---|---|---|
| CN | 201753726 U | 3/2011 |
| CN | 103453007 A | 12/2013 |
| CN | 103573797 A | 2/2014 |
| CN | 103841781 A | 6/2014 |
| CN | 104121275 A | 10/2014 |
| CN | 204044670 U | 12/2014 |
| CN | 104279221 A | 1/2015 |
| JP | 3134251 U | 8/2007 |
| JP | 2009059225 A | 3/2009 |
| JP | 2009104242 A | 5/2009 |
| JP | 2012057748 A | 3/2012 |
| JP | 2012215217 A | 11/2012 |
| TW | 201407055 A | 2/2014 |
| TW | 201546379 A | 12/2015 |

OTHER PUBLICATIONS

Machine Translation and Abstract of Chinese Publication No. CN104121275, Oct. 29, 2014, 12 pages.
Machine Translation and Abstract of Chinese Publication No. CN201327601, Oct. 14, 2009, 16 pages.
Machine Translation and Abstract of Chinese Publication No. CN201753726, Mar. 2, 2011, 19 pages.
Machine Translation and Abstract of Chinese Publication No. CN204044670, Dec. 24, 2014, 8 pages.
Machine Translation and Abstract of Japanese Publication No. JP3134251, Aug. 9, 2007, 25 pages.
Machine Translation and Abstract of Japanese Publication No. JP2012057748, Mar. 22, 2012, 23 pages.
Machine Translation and Abstract of Japanese Publication No. JP2012215217, Nov. 8, 2012, 32 pages.
Foreign Communication From a Counterpart Application, Chinese Application No. 201780005252.5, Chinese Office Action dated Apr. 28, 2019, 5 pages.
Foreign Communication From a Counterpart Application, PCT Application No. PCT/CN2017/074776, English Translation of International Search Report dated Sep. 7, 2017, 2 pages.
Foreign Communication From a Counterpart Application, PCT Application No. PCT/CN2017/074776, English Translation of Written Opinion dated Sep. 7, 2017, 4 pages.
Foreign Communication From a Counterpart Application, European Application No. 17874440.5, Extended European Search report dated Nov. 25, 2019, 8 pages.

* cited by examiner

NOTEBOOK COMPUTER

CROSS-REFERENCE TO RELATED APPLICATIONS

This application is a U.S. National Stage of International Patent Application No. PCT/CN2017/074776 filed on Feb. 24, 2017, which claims priority to Chinese Patent Application No. 201611065537.1 filed on Nov. 28, 2016. Both of the aforementioned applications are hereby incorporated by reference in their entireties.

TECHNICAL FIELD

This application relates to the field of electronic device technologies, and in particular, to a notebook computer.

BACKGROUND

A rotating shaft of a notebook computer is a key component that connects a display screen of the notebook computer and a base of the notebook computer. Specifically, a rotating shaft support is disposed on the display screen of the notebook computer, and a rotating shaft support is also disposed on the base of the notebook computer. During assembling, the rotating shaft support on the display screen of the notebook computer and the rotating shaft support on the base of the notebook computer are assembled with a same rotating shaft, so that the display screen of the notebook computer and the base of the notebook computer can be assembled.

However, to ensure reliability and stability of the rotating shaft of the notebook computer, for a large-sized notebook computer, a relatively large fixing area is usually required to fix a rotating shaft support of the rotating shaft, but space on the display screen of the notebook computer for disposing the rotating shaft support is relatively limited. Consequently, there is insufficient space for designing a rotating shaft on a display screen of an existing notebook computer.

SUMMARY

To resolve the foregoing technical problem, embodiments of this application provide a notebook computer, so as to resolve a problem that there is insufficient space for designing a rotating shaft on an existing notebook computer.

To resolve the foregoing problem, the embodiments of this application provide the following technical solutions.

According to a first aspect, an embodiment of this application provides a notebook computer, including a display screen, a base, a rotating shaft that connects the display screen and the base, a rotating shaft support that is disposed inside a housing of the display screen and that is connected to the rotating shaft in an assembly manner, and a drive circuit board disposed inside the housing of the display screen, where the rotating shaft support includes a first rotating shaft support and a second rotating shaft support, a projection of the drive circuit board and a projection of the first rotating shaft support do not overlap on a plane on which the display screen is located, and the projection of the drive circuit board and a projection of the second rotating shaft support at least partially overlap on the plane on which the display screen is located. When the rotating shaft support extends from two sides of the display screen of the notebook computer to the middle to a region in which the drive circuit board is located, at least a partial region of the second rotating shaft support is disposed under the drive circuit board, so that the drive circuit board and the second rotating shaft support share the partial region, to resolve a problem that a disposing location of the rotating shaft support conflicts with a disposing location of the drive circuit board when the rotating shaft support extends from the two sides of the display screen of the notebook computer to the middle to the region in which the drive circuit board is located. Therefore, an entire size of the notebook computer is not affected because an area of a bezel region of the display screen of the notebook computer is not increased, and costs are relatively low because the drive circuit board does not need to be modified.

With reference to the first aspect, in a first possible implementation, the first rotating shaft support includes a first body part fixedly connected to the housing of the display screen and a first fastener that is in an integrated structure with the first body part, and the second rotating shaft support includes a second body part fixedly connected to the housing of the display screen and a second fastener that is in an integrated structure with the second body part, where the first body part and the second body part are fixedly connected to the housing of the display screen, and the first fastener is connected to the rotating shaft in an assembly manner.

With reference to the first possible implementation of the first aspect, in a second possible implementation, the second fastener is connected to the rotating shaft in an assembly manner.

With reference to the first possible implementation of the first aspect, in a third possible implementation, the second fastener is fixedly connected to the first body part.

With reference to the third possible implementation of the first aspect, in a fourth possible implementation, the second fastener is connected to the first body part through riveting or welding.

With reference to any one of the first to the fourth possible implementations of the first aspect, in a fifth possible implementation, the second body part includes a first region that overlaps the projection of the drive circuit board and a second region that does not overlap the projection of the drive circuit board, and the first region is fixedly connected to the housing of the display screen by using a double-sided tape or through glue dispensing.

With reference to the fifth possible implementation of the first aspect, in a sixth possible implementation, the second region is connected to the housing of the display screen through threaded connection, or the second region is fixedly connected to the housing of the display screen by using a double-sided tape or through glue dispensing.

With reference to the first aspect or any one of the foregoing possible implementations, in a seventh possible implementation, the first body part is fixedly connected to the housing of the display screen by using a double-sided tape or through glue dispensing, or the first body part is connected to the housing of the display screen through threaded connection.

With reference to any one of the foregoing possible implementations of the first aspect, in an eighth possible implementation, a thickness of a preset region of the second rotating shaft support is less than a thickness of the first rotating shaft support, to increase strength of the first rotating shaft support, and improve stability between the rotating shaft support and the rotating shaft.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

As shown in the background, there is a problem that there is insufficient space for designing a rotating shaft on a display screen of an existing notebook computer.

Specifically, the display screen of the existing notebook computer includes a display region and a bezel region surrounding the display region. A drive circuit board and a rotating shaft support that is located on two sides of the drive circuit board and that is configured to fix a rotating shaft are disposed in the bezel region. To ensure stability of the rotating shaft that connects the display screen and a base of the notebook computer, the rotating shaft support configured to fix the rotating shaft usually extends from left and right sides of the notebook computer to a direction of the drive circuit board, so as to increase an area for fixing the rotating shaft support.

However, because an area of the bezel region of the display screen of the notebook computer is relatively limited, when the rotating shaft support extends from the direction of the drive circuit board to a region in which the drive circuit board is located, a disposing location of the rotating shaft support conflicts with a disposing location of the drive circuit board.

Figure 1:
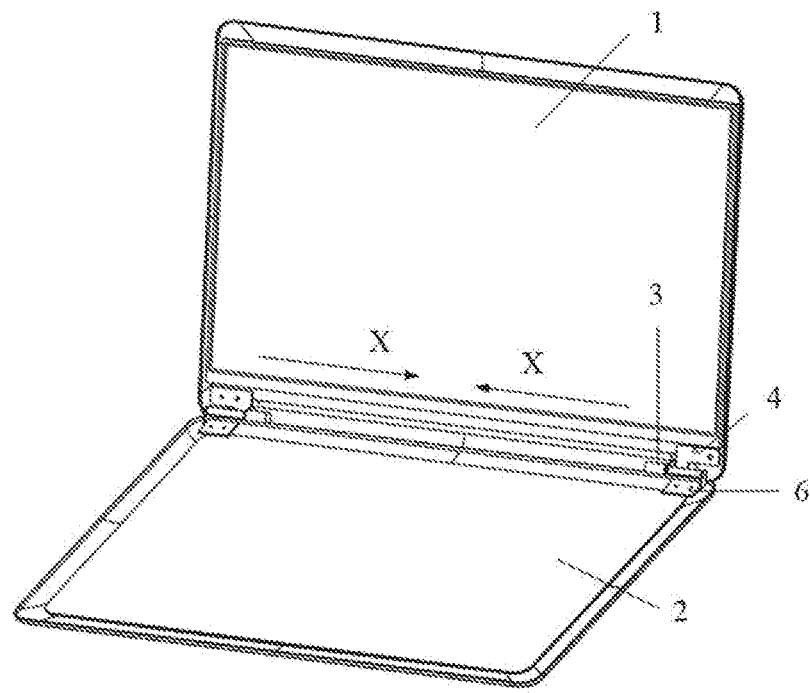
FIG. 1 is a schematic structural diagram of a notebook computer according to an embodiment of this application.
Figure 2:
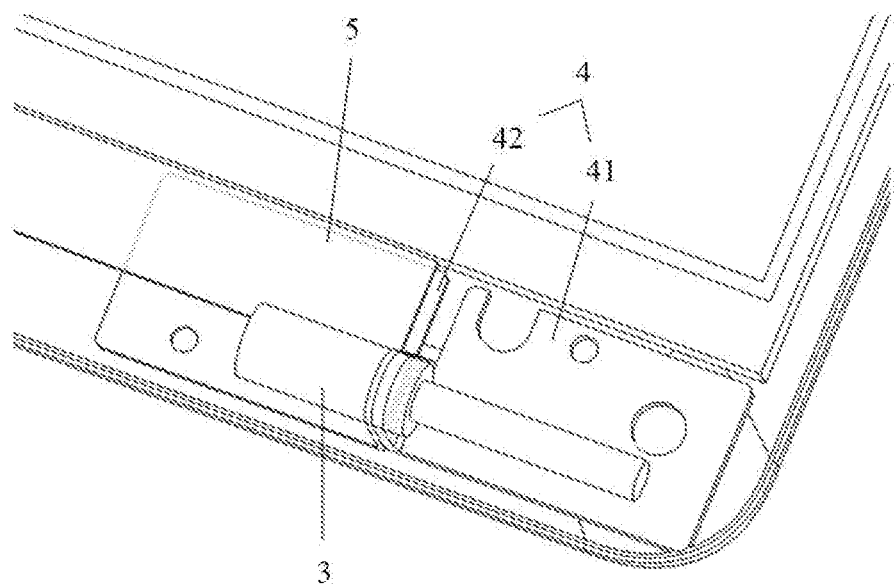
FIG. 2 is a schematic structural diagram of a rotating shaft support on a notebook computer according to an embodiment of this application.

In view of this, an embodiment of this application provides a notebook computer. As shown in FIG. 1, the notebook computer includes a display screen 1, a base 2, a rotating shaft 3 that connects the display screen 1 and the base 2, a rotating shaft support 4 that is disposed inside a housing of the display screen 1 and that is connected to the rotating shaft 3 in an assembly manner, and a drive circuit board disposed inside the housing of the display screen 1. As shown in FIG. 2, the rotating shaft support 4 includes a first rotating shaft support 41 and a second rotating shaft support 42, a projection of the drive circuit board 5 and a projection of the first rotating shaft support 41 do not overlap on a plane on which the display screen 1 is located, and the projection of the drive circuit board 5 and a projection of the second rotating shaft support 42 at least partially overlap on the plane on which the display screen 1 is located.

Figure 3:
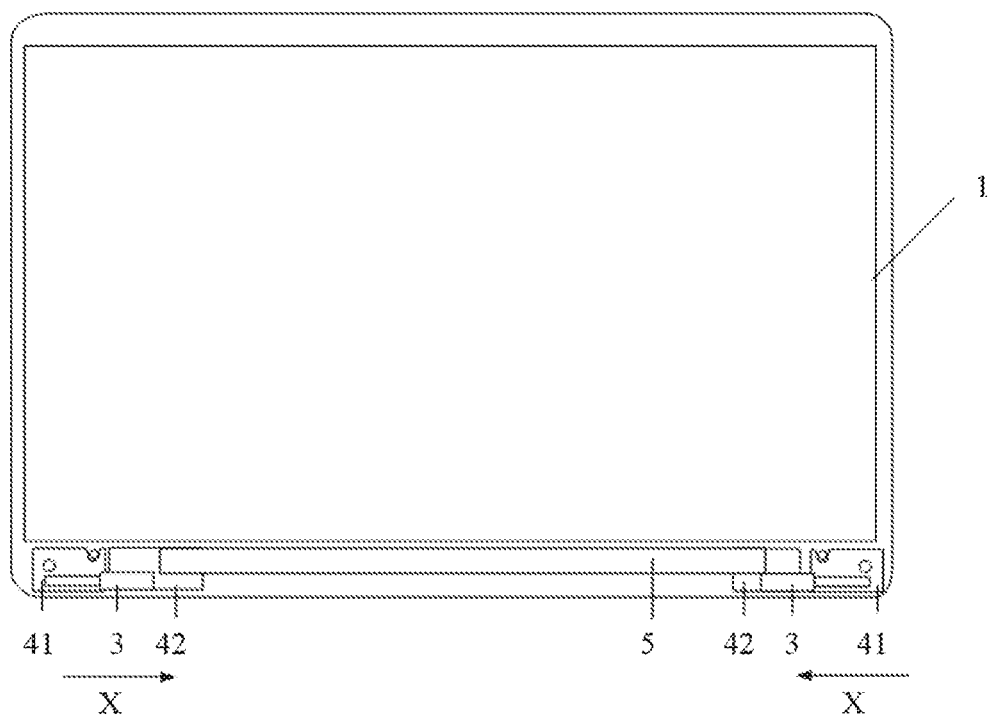
FIG. 3 is a schematic structural diagram of a display screen, a rotating shaft, and a rotating shaft support on a notebook computer according to an embodiment of this application.

Specifically, in an embodiment of this application, as shown in FIG. 3, a bezel region of the display screen 1 includes two rotating shaft supports 4 and the two rotating shaft supports 4 are configured to be respectively assembled with the rotating shaft 3 on two ends of the bezel region.

It should be noted that, in this embodiment of this application, the first rotating shaft support 41 is a primary bearing support and is configured to bear main weight of the housing of the display screen 1 and the rotating shaft 3, and the second rotating shaft support 42 is a secondary bearing support and is configured to extend in a direction from the first rotating shaft support 41 to the second rotating shaft support 42, to reduce a rotating shaft span between two sides of the housing of the display screen 1, and increase an area for fixing the rotating shaft support 4 and the housing of the display screen 1.

To increase a bearing capability of the first rotating shaft support 41 and improve stability between the rotating shaft 3 and the rotating shaft support 4, in an embodiment of this application, a thickness of a preset region of the second rotating shaft support 42 is less than a thickness of the first rotating shaft support 41. The preset region may be an entire region of the second rotating shaft support 42, or may be a partial region in the second rotating shaft support 42. This application imposes no limitation thereto provided that the preset region completely covers an overlapping region between the second rotating shaft support 42 and the drive circuit board.

It should be noted that, in this embodiment of this application, the thickness of the first rotating shaft support 41 may be the same as or different from a thickness of a rotating shaft support in the prior art. This is not limited in this application, and specifically depends on a situation.

It can be learned that, on the notebook computer provided in this embodiment of this application, the rotating shaft support 4 includes two parts: the first rotating shaft support 41 and the second rotating shaft support 42, and the projection of the drive circuit board and the projection of the second rotating shaft support 42 at least partially overlap on the plane on which the display screen 1 is located. When the rotating shaft support 4 extends from two sides of the display screen 1 of the notebook computer to the middle (that is, in a direction X) to a region in which the drive circuit board is located, at least a partial region of the second rotating shaft support 42 is disposed under the drive circuit board 5, so that the drive circuit board 5 and the second rotating shaft support 42 share the partial region, to resolve a problem that a disposing location of the rotating shaft support 4 conflicts with a disposing location of the drive circuit board 5 when the rotating shaft support 4 extends from the two sides of the display screen 1 of the notebook computer to the middle to the region in which the drive circuit board 5 is located. Therefore, an entire size of the notebook computer is not affected because an area of the bezel region of the display screen 1 of the notebook computer is not increased, and costs are relatively low because the drive circuit board 5 does not need to be modified.

It should be noted that, in this embodiment of this application, still as shown in FIG. 1, a housing of the base 2 includes another rotating shaft support 6, and is assembled with the rotating shaft 3 by using the another rotating shaft support 6. There is relatively sufficient available space for the rotating shaft support in the housing of the base. Therefore, in an embodiment of this application, the rotating shaft support in the housing of the base may be a rotating shaft support with a same thickness at all parts, to further improve fixing strength of the rotating shaft support. However, this application imposes no limitation thereto. In another embodiment of this application, when there is limited available space for the rotating shaft support in the housing of the base, a structure of the rotating shaft support provided in this embodiment of this application may be used for replacement, and this specifically depends on a situation.

Based on the foregoing embodiment, in an embodiment of this application, that the projection of the drive circuit board and the projection of the second rotating shaft support 42 at least partially overlap on the plane on which the display screen 1 is located may be: The drive circuit board 5 and the second rotating shaft support 42 partially overlap in the direction from the first rotating shaft support 41 to the second rotating shaft support 42 (that is, the direction X), or the drive circuit board 5 completely covers or partially covers the second rotating shaft support 42 in the direction from the first rotating shaft support 41 to the second rotating shaft support 42. This is not limited in this application, and specifically depends on a situation.

Figure 4:
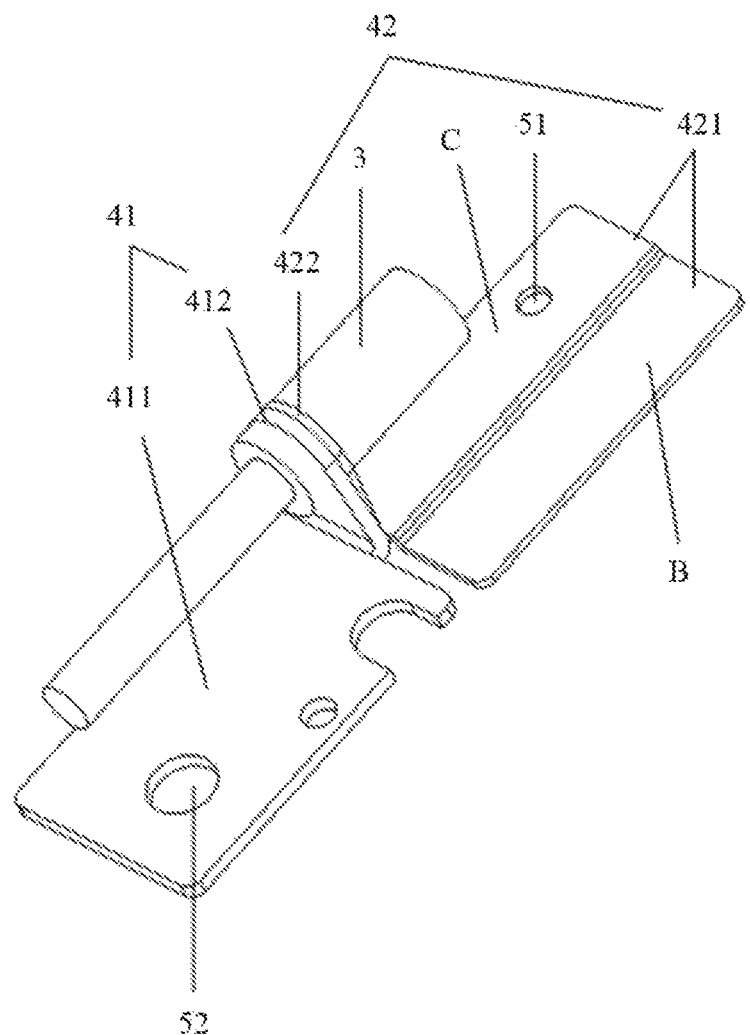
FIG. 4 is a schematic structural diagram of a rotating shaft support on a notebook computer according to another embodiment of this application.

Based on any one of the foregoing embodiments, in an embodiment of this application, as shown in FIG. 4, the first rotating shaft support 41 includes: a first body part 411 fixedly connected to the housing of the display screen 1 and a first fastener 412 that is in an integrated structure with the first body part 411, and the second rotating shaft support 42 includes a second body part 421 fixedly connected to the housing of the display screen 1 and a second fastener 422 that is in an integrated structure with the second body part 421. The first body part 411 and the second body part 421 are fixedly connected to the housing of the display screen 1, and the first fastener 412 is connected to the rotating shaft 3 in an assembly manner.

Specifically, in an embodiment of this application, the first fastener 412 is a bent arm, the bent arm includes a center through-hole, and the rotating shaft 3 passes through the center through-hole, to assemble and connect the first fastener 412 and the rotating shaft 3.

Figure 6:
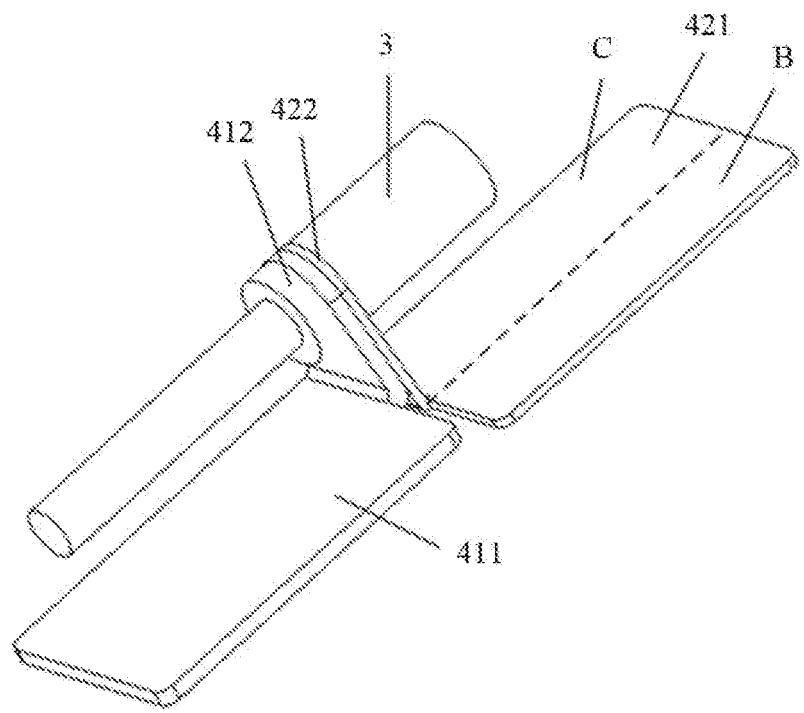
FIG. 6 is a schematic structural diagram of a rotating shaft support on a notebook computer according to yet another embodiment of this application.

Based on the foregoing embodiment, in an implementation of this application, as shown in FIG. 4 and FIG. 6, the second fastener 422 is connected to the rotating shaft 3 in an assembly manner, to increase fixing strength of the rotating shaft support 4 and the rotating shaft 3. Specifically, still as shown in FIG. 4 and FIG. 6, when the second fastener 422 is connected to the rotating shaft 3 in an assembly manner, in an embodiment of this application, the second fastener 422 includes a center through-hole, and the rotating shaft 3 passes through the center through-hole, to assemble and connect the second fastener 422 and the rotating shaft 3.

Figure 5:
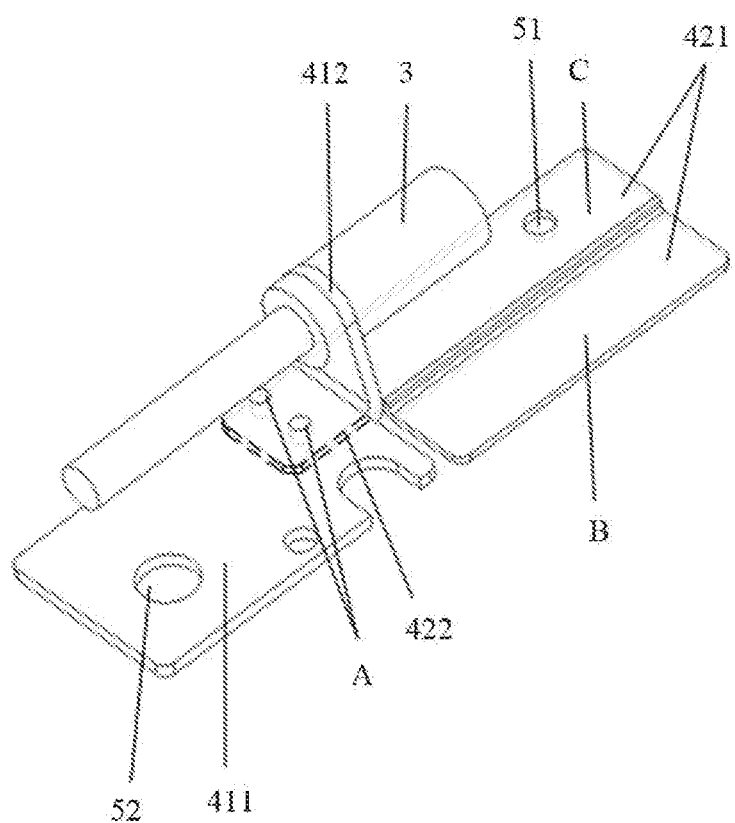
FIG. 5 is a schematic structural diagram of a rotating shaft support on a notebook computer according to still another embodiment of this application.
Figure 7:
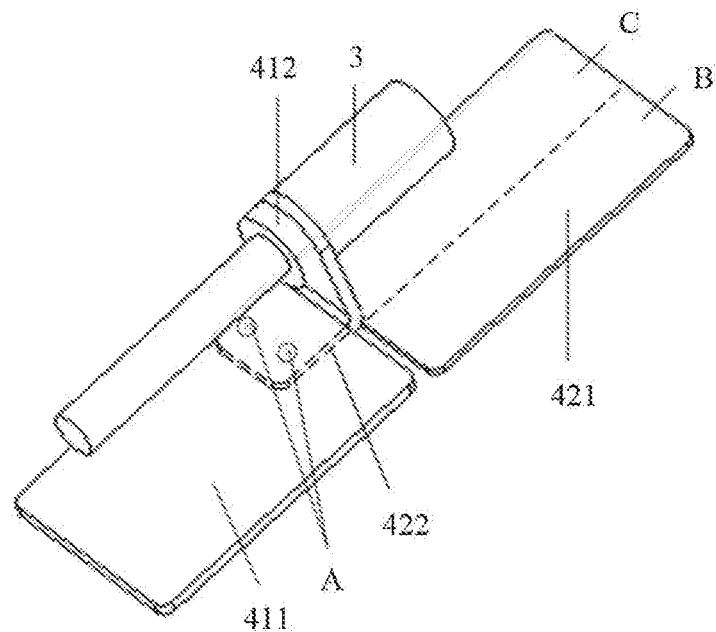
FIG. 7 is a schematic structural diagram of a rotating shaft support on a notebook computer according to still yet another embodiment of this application.

In another implementation of this application, the second fastener 422 is fixedly connected to the first body part 411. Specifically, as shown in FIG. 5 and FIG. 7, when the second fastener 422 is fixedly connected to the first body part 411, the second fastener 422 is connected to the first body part 411 through riveting or welding, to fixedly connect the second rotating shaft support 42 and the first rotating shaft support 41, so that the rotating shaft 3, the first rotating shaft support 41, and the second rotating shaft support 42 are connected to each other. As shown in FIG. 5 and FIG. 7, FIG. 5 and FIG. 7 show schematic diagrams of riveting connection between the second fastener 422 and the first body part 411, where A is a riveting point.

Based on any one of the foregoing embodiments, in an embodiment of this application, the second body part 421 includes a first region B that overlaps the projection of the drive circuit board and a second region C that does not overlap the projection of the drive circuit board, and the first region B is fixedly connected to the housing of the display screen 1 by using a double-sided tape or through glue dispensing. However, this application imposes no limitation thereto. In another embodiment of this application, in a direction perpendicular to the plane on which the display screen 1 is located, when a distance between the first region B and the drive circuit board allows, the first region B may also be connected to the housing of the display screen 1 through threaded connection. To be specific, the first region B includes a first threaded hole, and the first region B is locked to the housing of the display screen 1 through the first threaded hole by using a bolt.

Based on the foregoing embodiment, in an embodiment of this application, as shown in FIG. 6 and FIG. 7, the second region C is fixedly connected to the housing of the display screen 1 by using a double-sided tape or through glue dispensing. In another embodiment of this application, when space of the housing of the display screen 1 allows, the second region C is connected to the housing of the display screen 1 through threaded connection. Specifically, as shown in FIG. 4 and FIG. 5, the second region C includes a second threaded hole 51. Specifically, during fixing, a screw passes through the second threaded hole 51 of the second region C, so that the second region C of the second body part 421 is locked to the housing of the display screen 1.

It should be noted that, in this embodiment of this application, a thickness of the first region B in the second body part 421 may be the same as or different from a thickness of the second region C. When the thickness of the first region B is different from the thickness of the second region C, the thickness of the first region B is less than the thickness of the second region C, to ensure that when the first region B and the drive circuit board overlap, stability of the second rotating shaft support 42 is increased by increasing the thickness of the second region C. This is not limited in this application, and specifically depends on a situation. A thickness of the first body part 411 of the first rotating shaft support 41 may be greater than the thickness of the first region B. Stability of the first rotating shaft support 41 is increased by increasing the thickness of the first body part 411. The thickness of the first body part 411 may be the same as or different from the thickness of the second region C. This is not limited in this application, and specifically depends on a situation.

Based on any one of the foregoing embodiments, in an embodiment of this application, as shown in FIG. 6 and FIG. 7, the first body part 411 is fixedly connected to the housing of the display screen 1 by using a double-sided tape or through glue dispensing. In another embodiment of this application, the first body part 411 is connected to the housing of the display screen 1 through threaded connection. Specifically, as shown in FIG. 4 and FIG. 5, when the first body part 411 is connected to the housing of the display screen 1 through threaded connection, the first body part 411 includes a third threaded hole 52, and the first body part 411 is locked to the housing of the display screen 1 through the third threaded hole 52 by using a bolt.

It can be learned from the foregoing descriptions that, on the notebook computer provided in this embodiment of this application, the rotating shaft support 4 includes two parts: the first rotating shaft support 41 and the second rotating shaft support 42, the projection of the drive circuit board and the projection of the first rotating shaft support 41 do not overlap on the plane on which the display screen 1 is located, and the projection of the drive circuit board and the projection of the second rotating shaft support 42 at least partially overlap on the plane on which the display screen 1 is located. When the rotating shaft support 4 extends from two sides of the display screen 1 of the notebook computer to the middle to a region in which the drive circuit board is located, the second rotating shaft support 42 is disposed under the drive circuit board 5, so that the drive circuit board 5 and the second rotating shaft support 42 share a partial region, to resolve a problem that a disposing location of the rotating shaft support 4 conflicts with a disposing location of the drive circuit board 5 when the rotating shaft support 4 extends from the two sides of the display screen 1 of the notebook computer to the middle to the region in which the drive circuit board 5 is located. Therefore, an entire size of the notebook computer is not affected because an area of the bezel region of the display screen 1 of the notebook computer is not increased, and costs are relatively low because the drive circuit board does not need to be modified.

The notebook computer provided in this application is described below with reference to specific embodiments.

As shown in FIG. 4, in an embodiment of this application, the rotating shaft support includes a first rotating shaft support 41 and a second rotating shaft support 42. The first rotating shaft support 41 includes a first body part 411 and a first fastener 412, and the second rotating shaft support 42 includes a second body part 421 and a second fastener 422. The second body part 421 includes a first region B that overlaps the projection of the drive circuit board and a second region C that does not overlap the projection of the drive circuit board. Specifically, in this embodiment of this application, the first region B of the second body part 421 is fixedly connected to the housing of the display screen through glue dispensing or by using a double-sided tape, and the second region C of the second body part 421 is connected to the housing of the display screen through threaded connection. The second fastener 422 includes a center through-hole, and the rotating shaft 3 passes through the center through-hole to be connected to the second fastener 422 in an assembly manner. The first body part 411 is connected to the housing of the display screen through threaded connection. The first fastener 412 includes a center through-hole, and the rotating shaft 3 passes through the center through-hole to be connected to the first fastener 412 in an assembly manner.

As shown in FIG. 6, in another embodiment of this application, the rotating shaft support includes a first rotating shaft support and a second rotating shaft support, the first rotating shaft support includes a first body part 411 and a first fastener 412, and the second rotating shaft support 42 includes a second body part 421 and a second fastener 422. The second body part 421 includes a first region B that overlaps the projection of the drive circuit board and a second region C that does not overlap the projection of the drive circuit board. Specifically, in this embodiment of this application, the first region B of the second body part 421 is fixedly connected to the housing of the display screen through glue dispensing or by using a double-sided tape, and the second region C of the second body part 421 is fixedly connected to the housing of the display screen by using a double-sided tape or through glue dispensing. The second fastener 422 includes a center through-hole, and the rotating shaft 3 passes through the center through-hole to be connected to the second fastener 422 in an assembly manner. The first body part 411 is fixedly connected to the housing of the display screen by using a double-sided tape or through glue dispensing. The first fastener 412 includes a center through-hole, and the rotating shaft 3 passes through the center through-hole to be connected to the first fastener 412 in an assembly manner.

As shown in FIG. 5, in still another embodiment of this application, the rotating shaft support 4 includes a first rotating shaft support and a second rotating shaft support, the first rotating shaft support includes a first body part 411 and a first fastener 412, and the second rotating shaft support includes a second body part 421 and a second fastener 422. The second body part 421 includes a first region B that overlaps the projection of the drive circuit board and a second region C that does not overlap the projection of the drive circuit board. Specifically, in this embodiment of this application, the first region B of the second body part 421 is fixedly connected to the housing of the display screen through glue dispensing or by using a double-sided tape, and the second region C of the second body part 421 is connected to the housing of the display screen through threaded connection. The second fastener 422 is connected to the first body part 411 through riveting or welding. The first body part 411 is connected to the housing of the display screen through threaded connection. The first fastener 412 includes a center through-hole, and the rotating shaft 3 passes through the center through-hole to be connected to the first fastener 412 in an assembly manner.

As shown in FIG. 7, in yet another embodiment of this application, the rotating shaft support includes a first rotating shaft support and a second rotating shaft support, the first rotating shaft support 41 includes a first body part 411 and a first fastener 412, and the second rotating shaft support 42 includes a second body part 421 and a second fastener 422. The second body part 421 includes a first region B that overlaps the projection of the drive circuit board and a second region C that does not overlap the projection of the drive circuit board. Specifically, in this embodiment of this application, the first region B of the second body part 421 is fixedly connected to the housing of the display screen through glue dispensing or by using a double-sided tape, and the second region C of the second body part 421 is fixedly connected to the housing of the display screen by using a double-sided tape or through glue dispensing. The second fastener 422 is connected to the first body part 411 through riveting or welding. The first body part 411 is fixedly connected to the housing of the display screen by using a double-sided tape or through glue dispensing. The first fastener 412 includes a center through-hole, and the rotating shaft 3 passes through the center through-hole to be connected to the first fastener 412 in an assembly manner.

In conclusion, on the notebook computer provided in this embodiment of this application, the rotating shaft support 4 includes two parts: the first rotating shaft support 41 and the second rotating shaft support 42, the projection of the drive circuit board and the projection of the first rotating shaft support 41 do not overlap on the plane on which the display screen 1 is located, and the projection of the drive circuit board and the projection of the second rotating shaft support 42 at least partially overlap on the plane on which the display screen 1 is located. When the rotating shaft support 4 extends from two sides of the display screen 1 of the notebook computer to the middle to a region in which the drive circuit board is located, the second rotating shaft support 42 is disposed under the drive circuit board, so that the drive circuit board and the second rotating shaft support 42 share a partial region, to resolve a problem that a disposing location of the rotating shaft support conflicts with a disposing location of the drive circuit board when the rotating shaft support 4 extends from the two sides of the display screen 1 of the notebook computer to the middle to the region in which the drive circuit board is located. Therefore, an entire size of the notebook computer is not affected because an area of the bezel region of the display screen 1 of the notebook computer is not increased, and costs are relatively low because the drive circuit board does not need to be modified.

The embodiments in the specification are all described in a progressive manner. For same or similar parts in the embodiments, refer to these embodiments. Each embodiment focuses on a difference from other embodiments. The apparatus disclosed in the embodiments is described relatively simply because the apparatus corresponds to the method disclosed in the embodiments. For portions related to those of the method, refer to the description of the method.

The embodiments disclosed above are described to enable a person skilled in the art to implement or use this application. Various modifications made to the embodiments are obvious to a person skilled in the art, and the general principles defined in this specification may also be implemented in other embodiments without departing from the spirit or scope of this application. Therefore, this application is not limited to these embodiments described herein, but shall be construed in the widest scope consistent with the principles and novel features disclosed herein.

What is claimed is:

1. A notebook computer comprising:
a base;
a rotating shaft;
a display screen located at a first plane and comprising a housing, wherein the rotating shaft is configured to couple the display screen and the base, and wherein the housing comprises:
a drive circuit board; and
a rotating shaft support coupled to the rotating shaft and comprising:
a first rotating shaft support; and
a second rotating shaft support, wherein a portion of the drive circuit board at least partially overlaps a preset region of the second rotating shaft support on the first plane, and wherein a thickness of the preset region of the second rotating shaft support is less than a thickness of the first rotating shaft support.

2. The notebook computer of claim 1, wherein the first rotating shaft support comprises a first body part fixedly coupled to the housing and a first fastener coupled to the first body part, wherein the second rotating shaft support comprises a second body part fixedly coupled to the housing and a second fastener coupled to the second body part, and wherein the first fastener is coupled to the rotating shaft.

3. The notebook computer of claim 2, wherein the second fastener is coupled to the rotating shaft.

4. The notebook computer of claim 2, wherein the second fastener is fixedly coupled to the first body part.

5. The notebook computer of claim 4, wherein the second fastener is coupled to the first body part using a threaded hole.

6. The notebook computer of claim 2, wherein the second body part comprises a first region overlapping the projection of the drive circuit board and a second region that does not overlap the projection of the drive circuit board, and wherein the first region is fixedly coupled to the housing.

7. The notebook computer of claim 2, wherein the first body part is fixedly coupled to the housing of the display screen.

8. The notebook computer of claim 1, wherein the thickness of the preset region of the second rotating shaft support is less than a thickness of a second preset region of the second rotating shaft support, and wherein the portion of the drive circuit board does not overlap the second preset region of the second rotating shaft support.

9. A rotating shaft support for a notebook computer comprising a display screen that includes a housing and a drive circuit board disposed inside the housing, wherein the rotating shaft support comprises:
a first rotating shaft support; and
a second rotating shaft support, wherein a portion of the drive circuit board at least partially overlaps a preset region of the second rotating shaft support on the plane on which the display screen is configured to be located, wherein a thickness of the preset region of the second rotating shaft support is less than a thickness of the first rotating shaft support, and wherein the first rotating shaft support and the second rotating shaft support are configured to be disposed at the inside of the housing and coupled to a rotating shaft.

10. The rotating shaft support of claim 9, wherein the first rotating shaft support comprises a first body part that is configured to fixedly couple to the housing and a first fastener in a first integrated structure with the first body part, wherein the second rotating shaft support comprises a second body part that is configured to fixedly couple to the housing and a second fastener in a second integrated structure with the second body part, and wherein the first fastener is configured to couple to the rotating shaft.

11. The rotating shaft support of claim 10, wherein the second fastener is configured to couple to the rotating shaft.

12. The rotating shaft support of claim 10, wherein the second fastener is configured to fixedly couple to the first body part.

13. The rotating shaft support of claim 12, wherein the second fastener is configured to couple to the first body part using a threaded hole.

14. The rotating shaft support of claim 10, wherein the second body part comprises a first region overlapping the projection of the drive circuit board and a second region that does not overlap the projection of the drive circuit board, and wherein the first region is configured to fixedly couple to the housing.

15. The rotating shaft support of claim 14, wherein the second region is configured to fixedly couple to the housing.

16. The rotating shaft support of claim 10, wherein the first body part is configured to fixedly couple to the housing.

17. The rotating shaft support of claim 9, wherein the thickness of the preset region of the second rotating shaft support is less than a thickness of a second preset region of the second rotating shaft support, and wherein the portion of the drive circuit board does not overlap the second preset region of the second rotating shaft support.

18. The notebook computer of claim 1, wherein the present region of the second rotating shaft support is disposed under the portion of the drive circuit board.

19. The notebook computer of claim 2, wherein the first body part comprises a thread hole, and wherein the first body part is fixedly coupled to the housing of the display screen through the thread hole.

20. The rotating shaft support of claim 9, wherein the preset region of the second rotating shaft support is disposed under the portion of the drive circuit board.

* * * * *